(12) United States Patent
Huang

(10) Patent No.: US 8,411,047 B2
(45) Date of Patent: Apr. 2, 2013

(54) TOUCH-SENSITIVE DISPLAY PANEL

(75) Inventor: Sung-Hui Huang, Hsinchu (TW)

(73) Assignee: E Ink Holdings Inc., Hsinchu County (TW)

( * ) Notice: Subject to any disclaimer, the term of this patent is extended or adjusted under 35 U.S.C. 154(b) by 438 days.

(21) Appl. No.: 12/500,719

(22) Filed: Jul. 10, 2009

(65) Prior Publication Data

US 2010/0271316 A1 Oct. 28, 2010

(30) Foreign Application Priority Data

Apr. 23, 2009 (TW) .............................. 98113568 A

(51) Int. Cl.
*G06F 3/041* (2006.01)

(52) U.S. Cl. ........................................ 345/173; 349/158

(58) Field of Classification Search .................. 345/173; 349/158

See application file for complete search history.

(56) References Cited

U.S. PATENT DOCUMENTS

| | | | |
|---|---|---|---|
| 6,501,529 B1 * | 12/2002 | Kurihara et al. | 349/160 |
| 2003/0147016 A1 * | 8/2003 | Lin et al. | 349/12 |
| 2009/0156083 A1 * | 6/2009 | Nakazawa et al. | 445/24 |
| 2010/0001965 A1 * | 1/2010 | Wang et al. | 345/173 |
| 2010/0066650 A1 * | 3/2010 | Lee et al. | 345/64 |
| 2010/0231543 A1 * | 9/2010 | Momose | 345/173 |
| 2011/0248944 A1 * | 10/2011 | Liu et al. | 345/173 |

FOREIGN PATENT DOCUMENTS

| | | |
|---|---|---|
| EP | 1983409 A1 | 10/2008 |
| WO | WO2007091311 A1 | 8/2007 |

OTHER PUBLICATIONS

China Official Action issued Aug. 27, 2012.
Taiwan Official Action issued on Jan. 31, 2013.

* cited by examiner

*Primary Examiner* — Amare Mengistu
*Assistant Examiner* — Jennifer Zubajlo
(74) *Attorney, Agent, or Firm* — Chun-Ming Shih

(57) ABSTRACT

A touch-sensitive display panel including a first substrate, a second substrate, a display layer and at least one touch-sensitive device is provided. The second substrate is disposed opposite to the first substrate. The display layer is disposed between the first substrate and the second substrate. The touch-sensitive device is disposed between the first substrate and the second substrate and located beside the display layer. The displaying brightness of the touch-sensitive display panel is not adversely affected by the touch-sensitive device. In addition, the thickness of the touch-sensitive display panel is relative small.

4 Claims, 5 Drawing Sheets

TOUCH-SENSITIVE DISPLAY PANEL

BACKGROUND

This application claims priority to a Taiwan application No. 098113568 filed on Apr. 23, 2009.

1. Field of the invention

The present invention relates to a display panel and in particular, to a touch-sensitive display panel.

2. Description of the Prior Art

FIG. 1 is a schematic side view of a conventional touch-sensitive display panel. Referring to FIG. 1, the conventional touch-sensitive display panel 100 includes a touch panel 110 and a display panel 120. The display panel 120 has a display area 122, a first surface 124 and a second surface 126 opposite to each other. The display area 122 is located at the first surface 124. The display panel 120 includes a first substrate 121, a second substrate 123 and a display layer 125. The display layer 125 is disposed between the first substrate 121 and the second substrate 123. The display layer 125 is a liquid crystal layer. The first substrate 121 is a thin-film-transistor array substrate (TFT array substrate), and the second substrate 123 is a color filter substrate.

The touch panel 110 is disposed on the first surface 124 and corresponding to the display area 122. The touch panel 110 is a resistive touch panel or a capacitive touch panel.

However, when a user views the information displayed on the display area 122 along the viewing direction D1 of FIG. 1, because the touch panel 110 is disposed on the display area 122, therefore, the user must see the information displayed on the display area 122 through the touch panel 110. Thus, on the whole, the displaying brightness of the touch-sensitive display panel 100 is adversely affected by the touch panel 120. In addition, the thickness T1 of the touch-sensitive display panel 100 is relative large.

For the forgoing reasons, another conventional touch-sensitive display panel is provided. FIG. 2 is a schematic side view of another conventional touch-sensitive display panel. Referring to FIG. 2, the conventional touch-sensitive display panel 200 includes a plurality of force sensors 210, a display panel 220 and a fixing device 230. The display panel 220 has a display area 222, a first surface 224 and a second surface 226 opposite to each other. The display area 222 is located at the first surface 224.

The fixing device 230 has a bottom plate 232 and a plurality of fixing lines 234. The bottom plate 232 is disposed on the second surface 226, and the force sensors 210 are disposed between the bottom plate 232 and the display panel 220. Each of the fixing lines 234 connects the display panel 220 and the bottom plate 232. However, on a whole, the thickness T2 of the touch-sensitive display panel 200 is still relative large.

BRIEF SUMMARY

The present invention is directed to provide a touch-sensitive display panel which has a built-in touch-sensitive device.

The present invention provides a touch-sensitive display panel including a first substrate, a second substrate, a display layer and at least one touch-sensitive device. The second substrate is disposed opposite to the first substrate. The display layer is disposed between the first substrate and the second substrate. The touch-sensitive device is disposed between the first substrate and the second substrate and located beside the display layer.

In one embodiment of the present invention, the touch-sensitive device is a force sensor.

In one embodiment of the present invention, the touch-sensitive display panel further includes a ring-shaped frame disposed between the first substrate and the second substrate. The touch-sensitive device and the display layer are disposed within the ring-shaped frame.

In one embodiment of the present invention, the touch-sensitive display panel further includes a partition wall disposed between the first substrate and the second substrate and located within the ring-shaped frame. The partition wall is connected to the ring-shaped frame such that a first area is separated from a second area by the partition wall within the ring-shaped frame. The display layer is located at the first area, and the touch-sensitive device is located at the second area.

Because the touch-sensitive device is built-in between the first substrate and the second substrate and located beside the display layer. As compared to the conventional arts, when a user views the touch-sensitive display panel of the present invention, the displaying brightness of the touch-sensitive display panel is not adversely affected by the touch-sensitive device. In addition, the thickness of the touch-sensitive display panel of the present invention is relative small.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

DETAILED DESCRIPTION

[First Embodiment]

Figure 1:
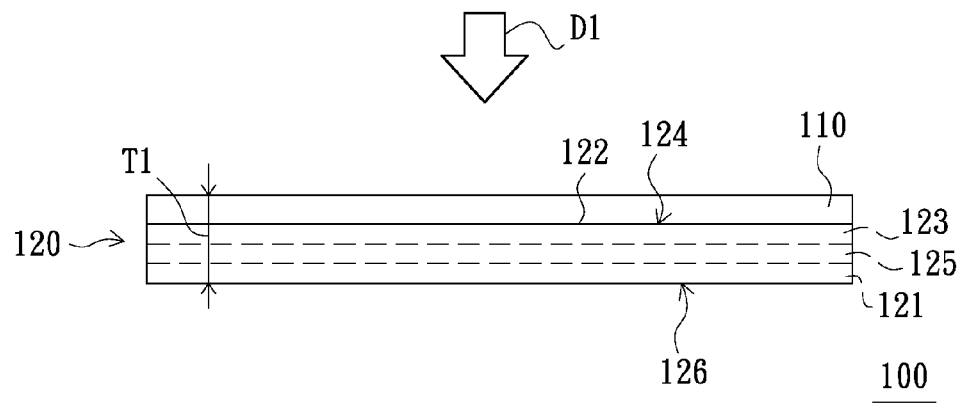
FIG. 1 is a schematic side view of a conventional touch-sensitive display panel.
Figure 2:
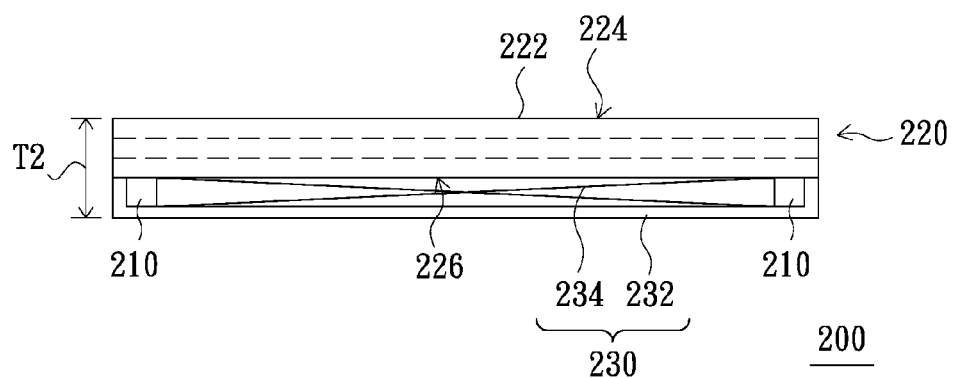
FIG. 2 is a schematic side view of another conventional touch-sensitive display panel.
Figure 3A:
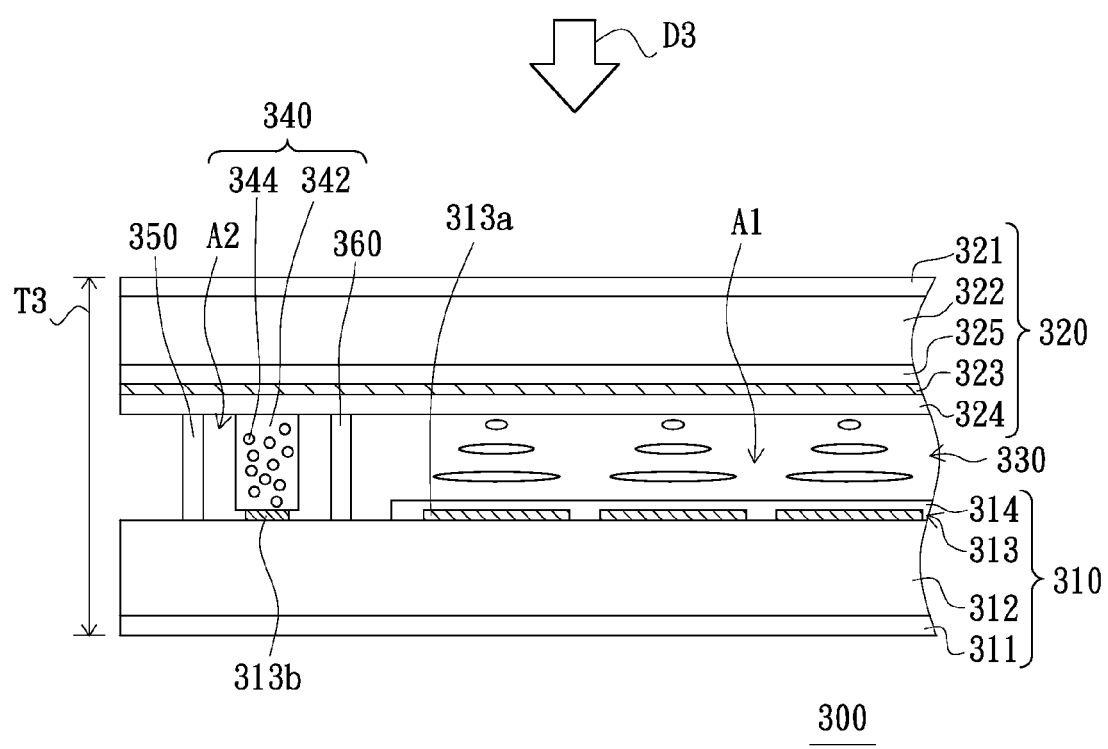
FIG. 3A is a schematic cross-sectional view of a touch-sensitive display panel according to a first embodiment of the present invention.
Figure 3B:
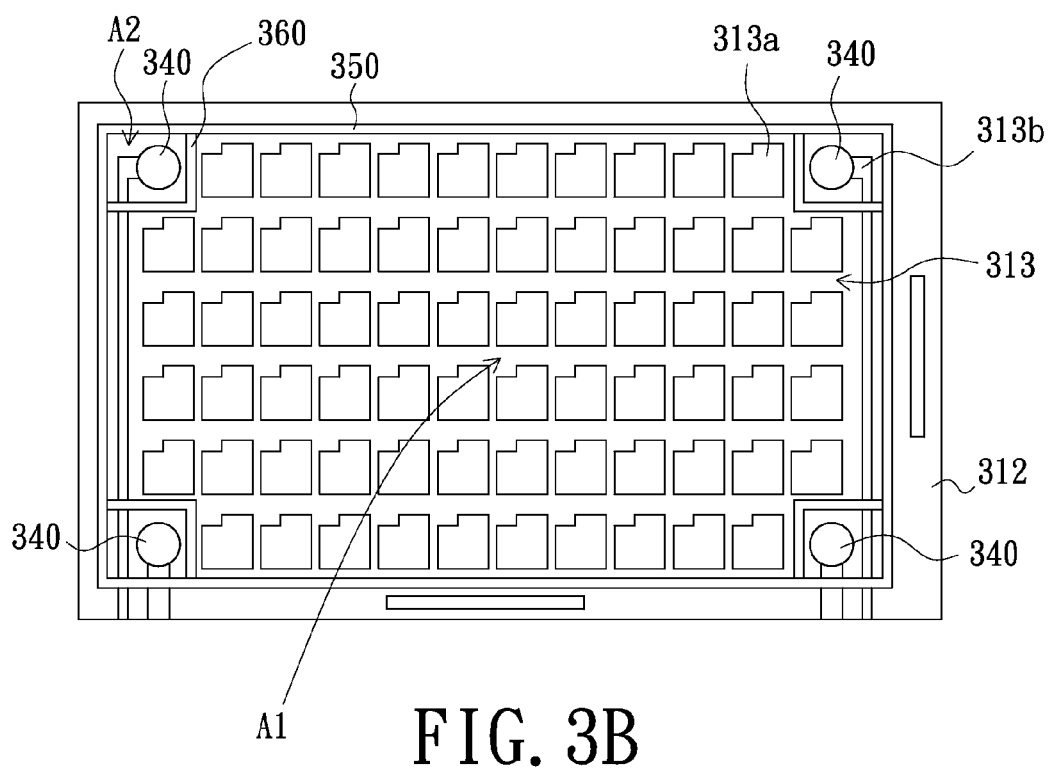
FIG. 3B is a schematic top view of part of elements of the touch-sensitive display panel of FIG. 3A.

FIG. 3A is a schematic cross-sectional view of a touch-sensitive display panel according to a first embodiment of the present invention. FIG. 3B is a schematic top view of part of elements of the touch-sensitive display panel of FIG. 3A. Referring to FIGS. 3A and 3B, the touch-sensitive display panel 300 includes a first substrate 310, a second substrate 320, a display layer 330 and at least one touch-sensitive device 340 (four touch-sensitive devices 340 are schematically shown in FIG. 3B). The second substrate 320 is disposed opposite to the first substrate 310. The first substrate 310 is, for example, a thin-film-transistor array substrate which includes a first polarizer 311, a first base 312, a first circuit layer 313 and a first alignment layer 314. The first polarizer 311 and the first circuit layer 313 are respectively disposed at opposite sides of the first base 312, and the first alignment layer 314 is disposed on the first circuit layer 313. The first circuit layer 313 has a plurality of pixel electrodes 313a arranged in an array, a plurality of thin-film-transistors (not shown) corresponding to the pixel electrodes 313a respectively, a plurality of scan lines (not shown), and a plurality of data lines (not shown).

The second substrate 320 is, for example, a color filter substrate which includes a second polarizer 321, a second base 322, a second circuit layer 323, a second alignment layer 324 and a color filter 325. The second polarizer 321 and the color filter 325 are respectively disposed on opposite sides of the second substrate 322. The second circuit layer 323 is, for example, a common electrode layer which is disposed on the color filter 325. The second alignment layer 324 is disposed on the second circuit layer 323.

The display layer 330 is, for example, a liquid crystal layer which is disposed between the first alignment layer 314 of the first substrate 310 and the second alignment layer 324 of the second substrate 320. The touch-sensitive devices 340 are disposed between the first circuit layer 313 of the first substrate 310 and the second alignment layer 324 of the second substrate 320. The touch-sensitive devices 340 are disposed beside the display layer 330. To sum up, the touch-sensitive display panel 300 is, for example, a touch-sensitive liquid crystal display panel.

Each of the touch-sensitive devices 340 is, for example, a force sensor such as a pressure-sensitive conductive element and disposed on a conductive trace 313b of the first circuit layer 313 of the first substrate 310. Each of the touch-sensitive devices 340 includes, for example, a rubber 342 and a plurality of conductive particles 344 dispersed in the rubber 342. When one of the touch-sensitive devices 340 bears a pressure, the touch-sensitive device 340 will be electrically connected with a corresponding conductive trace 313b and transmits an electrical signal to the corresponding conductive trace 313b.

The touch-sensitive display panel 300 further includes a ring-shaped frame 350 and at least a partition wall 360 (four partition walls 360 are schematically shown in FIG. 3B). The ring-shaped frame 350 and the partition walls 360 are disposed between the first base 312 of the first substrate 310 and the second alignment layer 324 of the second substrate 320. The touch-sensitive devices 340 and the display layer 330 are disposed within the ring-shaped frame 350. The partition walls 360 are disposed within the ring-shaped frame 350 and connected to the ring-shaped frame 350 such that a first area A1 is separated from a plurality of second areas A2 by the partitions 360 within the ring-shaped frame 350. The display layer 330 is located at the first area A1, and each of the touch-sensitive devices 340 is located at the corresponding second area A2.

Because the touch-sensitive devices 340 are built-in between the first substrate 310 and the second substrate 320 and beside the display layer 330. As compared to the conventional arts, when a user views the touch-sensitive display panel 300 along the viewing direction D3 in FIG. 3A, the displaying brightness of the touch-sensitive display panel 300 is not adversely affected by the touch-sensitive devices 340.

In addition, because the touch-sensitive devices 340 are built-in between the first substrate 310 and the second substrate 320 and beside the display layer 330. As compared to the conventional arts, the thickness T3 of the touch-sensitive display panel 300 is relative small.

[Second Embodiment]

Figure 4A:
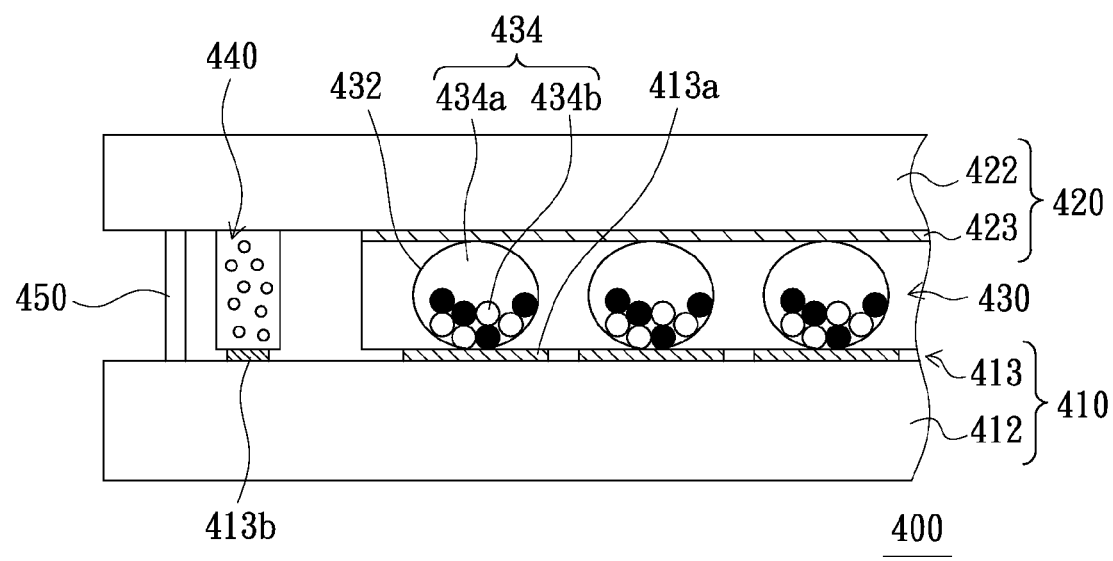
FIG. 4A is a schematic cross-sectional view of a touch-sensitive display panel according to a second embodiment of the present invention.
Figure 4B:
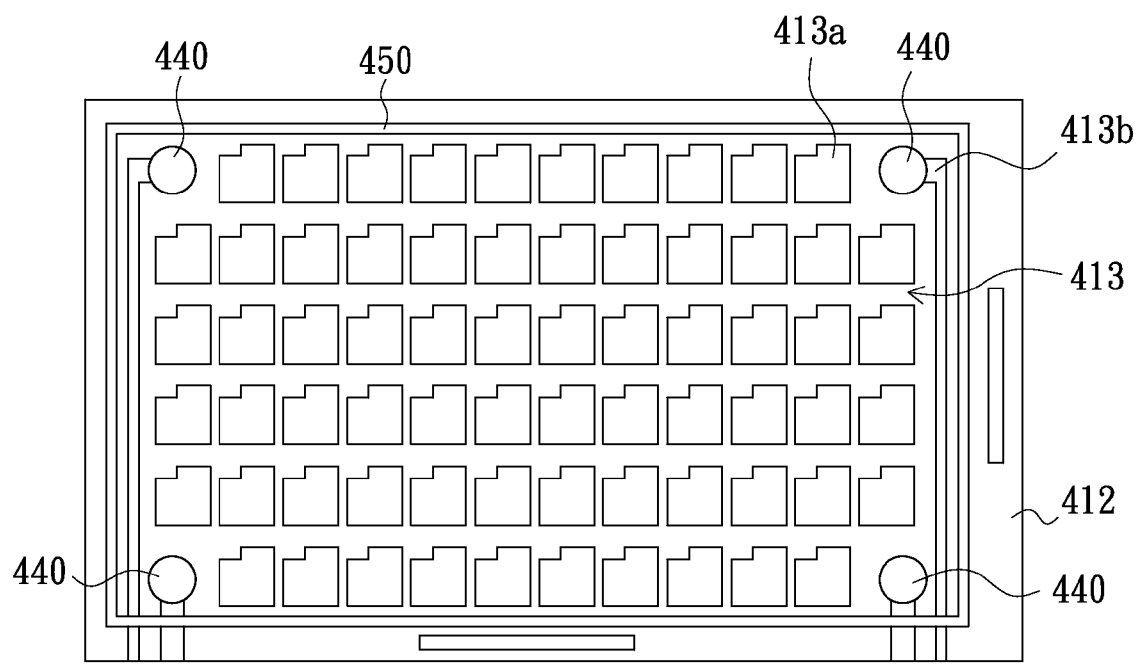
FIG. 4B is a schematic top view of part of elements of the touch-sensitive display panel of FIG. 4A.

FIG. 4A is a schematic cross-sectional view of a touch-sensitive display panel according to a second embodiment of the present invention. FIG. 4B is a schematic top view of part of elements of the touch-sensitive display panel of FIG. 4A. Referring to FIGS. 4A and 4B, the difference between the touch-sensitive display panel 400 of the second embodiment and the touch-sensitive display panel 300 of the first embodiment is that the touch-sensitive display panel 400 is a touch-sensitive electrophoresis display panel.

The first substrate 410 is, for example, a thin-film-transistor array substrate which includes a first base 412 and a first circuit layer 413. The first circuit layer 413 is disposed on the first base 412. The first circuit layer 413 has a plurality of pixel electrodes 413a arranged in an array, a plurality of thin-film-transistors (not shown) corresponding to the pixel electrodes 413a respectively, a plurality of scan lines (not shown), and a plurality of data lines (not shown). The second substrate 420 includes a protect sheet 422 and a second circuit layer 423. The second circuit layer 423 is, for example, a common electrode layer disposed on the protect sheet 422.

The display layer 430 is, for example, an electrophoresis layer disposed between the first circuit layer 413 of the first substrate 410 and the second circuit layer 423 of the second substrate 420. The display layer 430 such as the electrophoresis layer includes a plurality of microcapsules 432 and an electrophoretic fluid 434 filling each of the microcapsules 432. The electrophoretic fluid 434 in each of the microcapsules 432 includes a dielectric solvent 434a and a plurality of electrophoretic particles 434b. The electrophoretic particles 434b of each of the microcapsules 432 are dispersed in the corresponding dielectric solvent 434a. In the present embodiment, the electrophoretic particles 434b of each of the microcapsules 432 may be a combination of black electrophoretic particles and white electrophoretic particles. In addition, the microcapsules 432 of the present embodiment may be replaced by a plurality of microcups. The scope of the present invention is not limited herein.

The touch-sensitive devices 440 are disposed between the first circuit layer 413 of the first substrate 410 and the protect sheet 422 of the second substrate 420 and beside the display layer 430. Concretely, each of the touch-sensitive devices 440 is disposed on a conductive trace 413b of the first circuit layer 413. In addition, the touch-sensitive devices 440 and the display layer 430 are disposed within the ring-shaped frame 450, and the partition walls shown in FIG. 3B may be omitted in the touch-sensitive display panel 400.

According to the mentioned above, the touch-sensitive display panel of the embodiment of the present invention has at least one of the following or other advantages:

1. Because the touch-sensitive device is built-in between the first substrate and the second substrate and beside the display layer. As compared to the convention arts, when the user views the touch-sensitive display panel of the present invention, the displaying brightness of the touch-sensitive display panel is not adversely affected by the touch-sensitive device.

2. Because the touch-sensitive device is built-in between the first substrate and the second substrate and beside the display layer. As compared to the convention arts, the thickness of the touch-sensitive display panel of the embodiment of the present invention is relative small.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A touch-sensitive display panel comprising:
a first substrate with a plurality of pixel electrodes disposed thereon;
a second substrate disposed opposite to the first substrate;
a display layer disposed between the first substrate and the second substrate and completely covering the pixel electrodes;
at least one touch-sensitive device disposed between and contacting with the first substrate and the second substrate and located outside of the display layer; and
a partition wall disposed between the first substrate and the second substrate and separating the touch-sensitive device from the display layer.

2. The touch-sensitive display panel as claimed in claim 1, wherein the touch-sensitive device is a force sensor.

3. The touch-sensitive display panel as claimed in claim 1 further comprising a ring-shaped frame disposed between the first substrate and the second substrate, wherein the touch-sensitive device and the display layer are disposed within the ring-shaped frame.

4. The touch-sensitive display panel as claimed in claim 3, wherein the partition wall is located within the ring-shaped frame, and the partition wall is connected to the ring-shaped frame such that a first area is separated from a second area by the partition wall within the ring-shaped frame, the display layer is located at the first area, and the touch-sensitive device is located at the second area.

* * * * *